United States Patent [19]

Martinson et al.

[11] 4,272,084
[45] Jun. 9, 1981

[54] HIGH PRESSURE SHAFT SEAL

[75] Inventors: Arthur R. Martinson; Victor D. Rogers, both of Portland, Oreg.

[73] Assignee: Guy F. Atkinson Company, Portland, Oreg.

[21] Appl. No.: 34,397

[22] Filed: Apr. 30, 1979

[51] Int. Cl.³ .................... F16J 15/54; F16J 15/56
[52] U.S. Cl. .................................. 277/30; 277/17;
277/22; 277/23; 277/93 R; 277/96; 277/15;
277/3; 277/41
[58] Field of Search .................. 277/3, 15, 27, 17, 22,
277/23, 26, 30, 38, 39–41, 74, 83, 86, 93 R, 93
SD, 96.1, 96.2, 96

[56] References Cited

U.S. PATENT DOCUMENTS

| | | | |
|---|---|---|---|
| 2,418,194 | 4/1947 | Piccardo | 277/3 |
| 2,586,739 | 2/1952 | Summers | 277/93 X |
| 2,824,759 | 2/1958 | Tracy | 277/15 |
| 3,275,330 | 9/1966 | Rein et al. | 277/1 |
| 3,356,377 | 12/1967 | Voitik | 277/40 |
| 3,360,272 | 12/1967 | Blom et al. | 277/3 |
| 3,941,395 | 3/1976 | Ball et al. | 277/41 |
| 4,094,513 | 6/1978 | Kime et al. | 277/41 |
| 4,095,806 | 6/1978 | Dempsey | 277/27 |
| 4,099,728 | 7/1978 | Wiese | 277/96 |

FOREIGN PATENT DOCUMENTS

| | | | |
|---|---|---|---|
| 2503984 | 8/1975 | Fed. Rep. of Germany | 277/30 |
| 379210 | 8/1932 | United Kingdom | 277/23 |
| 493573 | 10/1938 | United Kingdom | 277/86 |
| 863527 | 3/1961 | United Kingdom | 277/3 |
| 941141 | 11/1963 | United Kingdom | 277/27 |
| 1141049 | 1/1969 | United Kingdom | 277/96.2 |

*Primary Examiner*—Robert S. Ward, Jr.
*Attorney, Agent, or Firm*—Lee R. Schermerhorn

[57] ABSTRACT

A multiple stage mechanical end face seal assembly which has been developed to improve seal reliability and performance during both steady-state and transient operation. The seal assembly features a rotating seal ring mounting system which utilizes a rigid support ring loaded thru narrow annular projections in combination with centering non-sealing O-rings which effectively isolate the rotating seal ring from temperature and pressure transients while securely positioning the ring to adjacent parts, and a stationary seal ring mounting configuration which allows the stationary seal ring freedom of motion to follow shaft axial movement up to ¾ of an inch and shaft tilt about the pump axis without any change in the hydraulic or pressure loading on the stationary seal ring or its carrier. An internal filter arrangement prevents plugging of the pressure staging coils in a multi-stage seal assembly.

18 Claims, 8 Drawing Figures

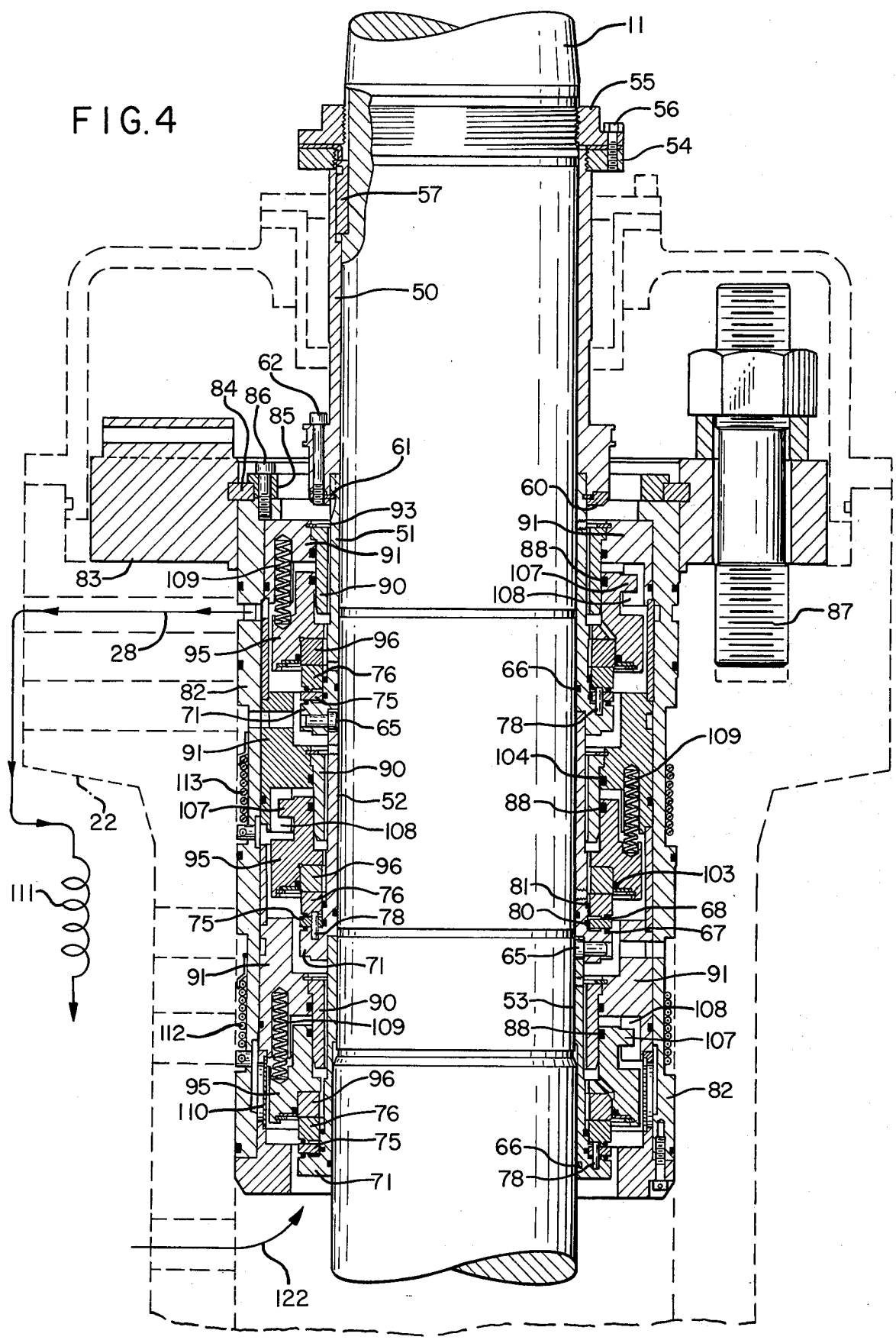

HIGH PRESSURE SHAFT SEAL

BACKGROUND OF THE INVENTION

This invention relates to improvements in high pressure shaft seals to prevent the uncontrolled leakage of liquid along a rotating shaft, as for example the shaft of a rotary liquid pump.

Although the present invention is not limited to any particular application or field of use it was developed to meet the exacting requirements and extreme conditions encountered in primary coolant pumps for nuclear power plants where the existing prior art seals have proved inadequate or at least marginal in meeting performance requirements. Reliable and predictable performance of reactor coolant pump seals is essential to the safe operation and availability of nuclear power plants. An unscheduled plant shut down due to poor seal performance or seal failure can be extremely expensive to both the utility company and the seal supplier. Also, servicing of such seals is a very difficult and demanding job owing to the nuclear environment and limited accessibility in the reactor containment building.

Reactor coolant pump seals must be capable of operating under extreme conditions not encountered in other types of service. Steady state operating conditions under high pressure and high temperature present serious problems in themselves but reactor coolant pump seals must perform under widely changing conditions of pressure, temperature, and shaft position.

The normal operating pressure in a pressure water reactor is near 2200 psig and during start up of a plant the pressure can be as low as 300 psig.

Other excussions from normal pump operation as a result of support system malfunctions or failure also cause wide variations in the system operating pressure. Therefore the variations in seal operating pressure can be large in magnitude.

The same is true in regard to temperature. The normal operating temperature of the water in the reactor coolant loop is near 600° F. Under normal operating conditions the shaft seals are cooled and pressure staged by water supplied from an auxiliary high pressure injection system. The nominal temperature of the water entering the seal area is 120° F. In the event of a malfunction or failure of the injection system, the water in the seal cavity is replaced with water from the reactor coolant loop. Since this water is extremely hot it must be cooled in the pump heat exchanger prior to reaching the seal area. The temperature of the water in the seal area during this mode of operation is dependent upon total outflow from the seals (leakage plus staging flow) and heat exchanger performance characteristics. Therefore, the temperatures reached and the rate at which they change during any given loss of injection can be extremely variable.

A typical U.S. vertical reactor coolant pump is arranged with the shaft supported by three bearings, two of which are in the motor on the upper end of the shaft and one in the pump just above the centrifugal impeller. During operation the unbalanced radial load at the pump impeller, an inherent characteristic of a centrifugal pump, causes the shaft to bend between the pump bearing and motor bearings. The shaft is also displaced in the vertical direction (axial) during operation due to shaft end thrust (pressure loading) and thermal expansion. The magnitude and rate of displacement are dependent upon system operating conditions (system temperature, pressure, and pump flow rate). Maximum displacement (radial offset) occurs close to the position of the seal elements.

Since conventional (prior art) seals have proven only marginal in meeting the extreme and variable operating conditions experienced in reactor coolant pumps, the objectives of the present invention are to provide improved high pressure shaft seals capable of operating effectively under the described normal and transient operating conditions, to provide seals having a longer life than conventional seals, to provide seals having more predictable performance, to provide seals having improved reliability and maintainability, and to provide seals capable of easier assembly and faster installation.

BASIC SEAL ARRANGEMENT

The basic seal arrangement to which the invention described herein has been applied is that of "Balanced Mechanical End Face Seal" in which all of the seal geometric "balance" areas (diameters) are located on the "floating" non-rotating seal parts (stator). This arrangement (balanced stator) is one of four "basic" balanced mechanical end face configurations commonly in use by the seal industry today.

It was selected for this application (reactor coolant pump seal) as it has the inherent capability to tolerate pump shaft tilt (if given freedom of movement) without subjecting the "floating" stator and secondary seal to axial cycling relative to the secondary seal sleeve. Therefore, the secondary seal resilient O-rings and secondary seal sleeves in this seal assembly are not subjected to axial wear as they were in prior art "floating" rotor seals. The "basic" balanced stator seal arrangement also has the inherent capability of maintaining a constant geometric balance when one seal face is displaced radially relative to the other as as result of shaft tilt or radial misalignment of shaft to pump housing.

In the present construction, the seal provided consists of three identical seal stages which are bench assembled as a single unit for quick and easy installation into a reactor coolant pump.

SUMMARY OF INVENTION

The "basic" balanced stator seal arrangement was modified and improved as follows:

This seal assembly, unlike prior art end-face seals, is designed to accommodate large changes in axial shaft position during operation. This feature allows the seal to be "set" with a very liberal operating gap to protect the seal from bottoming out during axial movement of the shaft and it also allows the seal assembly to accommodate large shaft displacements when the shaft coupling is removed for pump or motor maintenance. The total allowance for axial displacement in this seal without losing seal face contact is three quarters of an inch.

Since the stator is the "floating" element in this seal arrangement, rotation about the shaft axis must be prevented. This is accomplished by a single anti-rotation lug which is positioned directly over the secondary seal. A single lug over the secondary seal optimizes the stator loading and allows freedom of movement at the seal faces (radial) to accommodate shaft tilt.

One of the most important features of the invention is the novel manner in which the rotating seal ring (tungsten carbide) is mounted on and isolated from the seal sleeve (stainless steel) in each of the three seal stages previously mentioned. The rotating seal ring is supported on and isolated from the seal sleeve through the use of an intermediate support ring and a non-sealing O-ring at its inner diameter. Although the support ring is thinner than the rotating seal ring it has the same radial dimensions and material properties, therefore both rings exhibit the same hoop stiffness and radial expansion rates.

The sleeve, however, due to the difference in materials used, does not expand at the same rate as these rings, therefore a radial friction induced force is developed at the interface between the sleeve and the support ring during temperature and pressure aransients. This radial force on the support ring subjects the ring to an unbalanced moments which causes it to deflect or twist slightly. However, since the rotating seal ring is supported on a narrow nose (annular projection) the resulting deflection of the support ring during transient operation has an insignificant effect upon the deflection of the rotating seal ring.

The O-rings which are located between the sleeve and the inner diameters of both the rotating and support rings center these rings on the sleeve and allow ample radial clearance between the rings and sleeve to accommodate differences in thermal expansion during temperature changes.

Various changes may be made in the details of construction and arrangement of parts and certain features may be used without others. All such modifications within the scope of the appended claims are included in the invention. Also, the invention is not limited to pump shafts or nuclear reactor coolant pumps. The invention will be better understood and additional objects and advantages will become more apparent from the following description with reference to the accompanying drawings.

BRIEF DESCRIPTION OF THE DRAWINGS

FIG. 4 is a vertical sectional view of the three stage seal assembly of the invention as installed in a reactor coolant pump.

DETAILED DESCRIPTION OF THE PREFERRED EMBODIMENT

Figure 1:
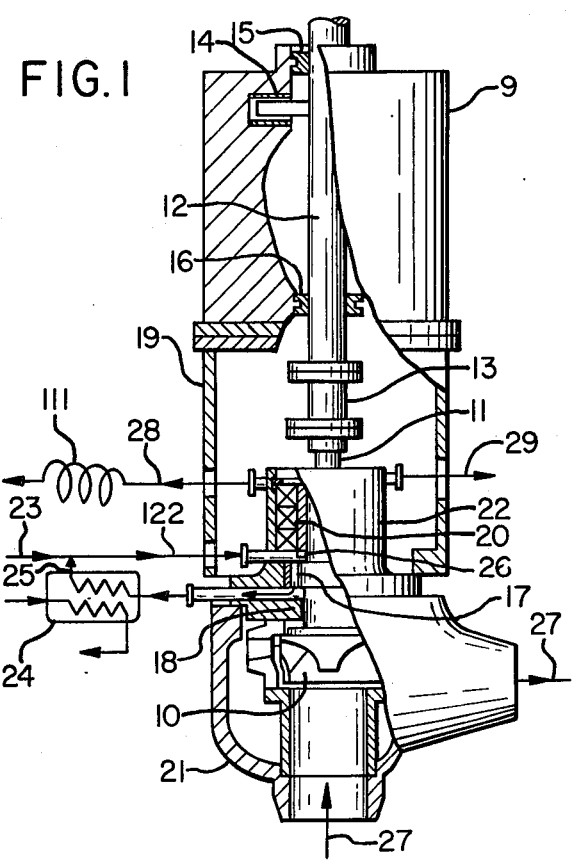
FIG. 1 is a diagrammatic view of a typical U.S. reactor coolant pump and motor arrangement to which the invention is adapted.

The mechanical arrangement of a typical reactor coolant pump is illustrated diagrammatically in FIG. 1. A large capacity pump impeller 10 is mounted on the lower end of a large diameter vertical pump shaft 11 which is driven by a motor 9 through a motor shaft 12 and coupling 13 which rigidly connects the motor shaft 12 to the pump shaft 11. The coupling 13 is of sufficient length to allow removal of the seal assembly contained in the seal area 20 as a single unit.

The shafts, impeller and coupling are supported by a double acting thrust bearing 14, an upper motor bearing 15, a lower motor-bearing 16, and a water lubricated pump bearing 17 just above the flow restriction bushing 18 and impeller 10. The motor 9 is supported by a motor stand 19 which is attached to the pump 21 thru the stuffing box 22.

The seal assembly, in the seal area designated by numeral 20 within stuffing box 22, is supplied with injection water 23 which serves the purpose of both cooling and pressure staging the seal. During normal operation (injection water 23 supply system working) the injection water 23 is mixed with heat exchanger 24 recircutating flow 25 prior to entering the pump stuffing box 22. The recirculation pumpage 25 is circulated through the pump heat exchanger 24 and pump bearing 17 by means of a small axial flow pump 26 mounted on the pump shaft 11 above the pump bearing 17. Also, during normal operation a portion of the injection flow 23 flows into the reactor coolant pump 21 thru the restriction bushing 18 located between the pump bearing 17 and impeller 10. This portion of the injection water prevents high temperature reactor coolant pumpage 27 from flowing into the stuffing box 22 and seal area 20 thru the restriction bushing 18.

Another portion of the injection water 23 flows through seal area 20 and leaves stuffing box 22 through flow return 28, and if the upper seal stage is leaking, a portion of this water leaves the stuffing box through the leakage flow return 29.

The presence of shaft tilt in a reactor coolant pump strongly influenced the design and the basic seal configuration selected for the present seal. To fully understand the impact on seal performance, an explanation of the source and magnitude of shaft tilt follows.

Figure 2:
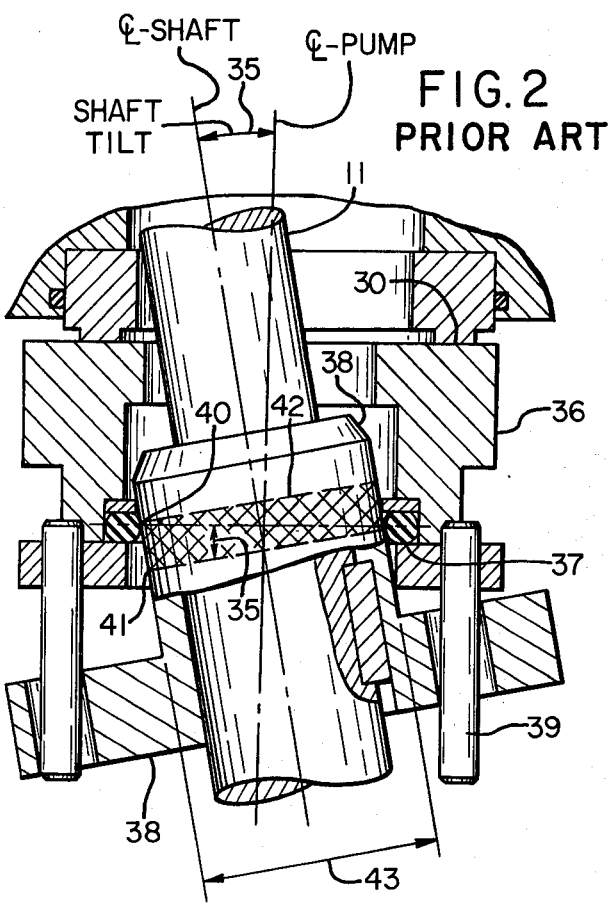
FIG. 2 illustrates the problem of shaft tilt upon a prior art seal in which the "floating" seal ring and secondary seal are on the rotor and rotate with the seal sleeve and shaft. The angle of shaft tilt and scale of the drawing are exaggerated for the purpose of illustration.
Figure 3:
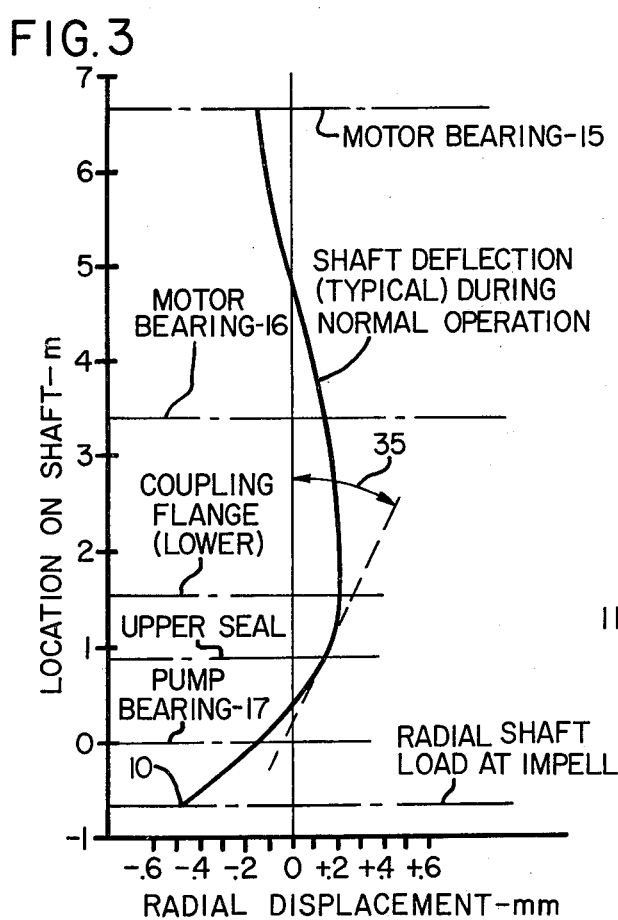
FIG. 3 illustrates the shaft deflection calculated for a typical three bearing reactor coolant pump, such as that shown in FIG. 1, at nominal operating conditions relative to the pump centerline.

During operation of the pump, an unbalanced radial load (an inherent characteristic of most pumps) is developed on the pump impeller 10 which causes the shaft to bend, as shown in FIG. 3. This not only causes the shaft 11 to be displaced radially thru seal areas 20, but causes it to tilt, as illustrated to an exaggerated degree, in FIG. 2 and FIG. 3. The angle of tilt in FIG. 2 is indicated at 35 with the understanding that this angle varies along the length of the shaft in both direction and magnitude, as illustrated graphically in FIG. 3.

The "floating" rotor seal arrangement, shown in FIG. 2, was used in prior art seals supplied with reactor coolant pumps and is no longer recommended for pumps which have large diameter shafts and operate with shaft tilt to the degree shown in FIG. 3. Shaft tilt 35 in this prior art seal arrangement causes the rotating seal ring 36 and secondary seal 37 to slide axially on the secondary seal sleeve 38. This sliding motion is cyclic, one excursion per shaft 11 revolution, and occurs because of three factors present in this prior art design.

The first factor is that the rotating seal ring 36 is "floating", being pressed upward by springs, not shown, and is given freedom of movement relative to the secondary seal sleeve 38 enabling it to maintain constant mutual face contact with the stationary seal face 30. The second factor is that the rotating seal ring 36, which is driven by pins 39, rotates with the shaft 11. The third factor is that the shaft 11 and secondary seal sleeve 38, which is rigidly attached to the shaft 11, transcend the seal area at an angle 35. This angle 35 in FIG. 2 is shown between the shaft 11 centerline and pump centerline. The centerline of rotating seal ring 36 is parallel with the pump centerline so that the angle 35 always exists between the rotating seal ring 36 and shaft 11.

This angular displacement causes the secondary seal 37 to be cocked relative to the shaft 11 at the same angle 35, as shown in FIG. 2. Then, as the shaft 11 and rotating seal ring 36 rotate thru one complete revolution the secondary seal 37 is displaced axially relative to the secondary seal sleeve 38, from point 40 to point 41 and then back to point 40 on the contact zone 42 (crosshatched area) of the sleeve 38.

The size of the contact zone 42 which defines the area where the secondary seal 37 slides on the sleeve 38 is dependent upon the angle of shaft tilt 35 and the diameter 43 of the sleeve. (The larger the diameter 43, or the greater the angle of tilt 35, the greater the distance between points 40 and 41 on the sleeve 38.)

Cyclic sliding, as described above, eventually causes the secondary seal 37 or secondary seal sleeve 38 in the area of the contact zone 42 to wear out and usually results in a seal failure.

However, the balanced stator seal configuration, with the invention herein described, is unaffected by shaft tilt because of the inherent design configuration, in which the axis of a "floating" stator remains parallel to the shaft centerline regardless of shaft position.

Figures 5, 6, 7:
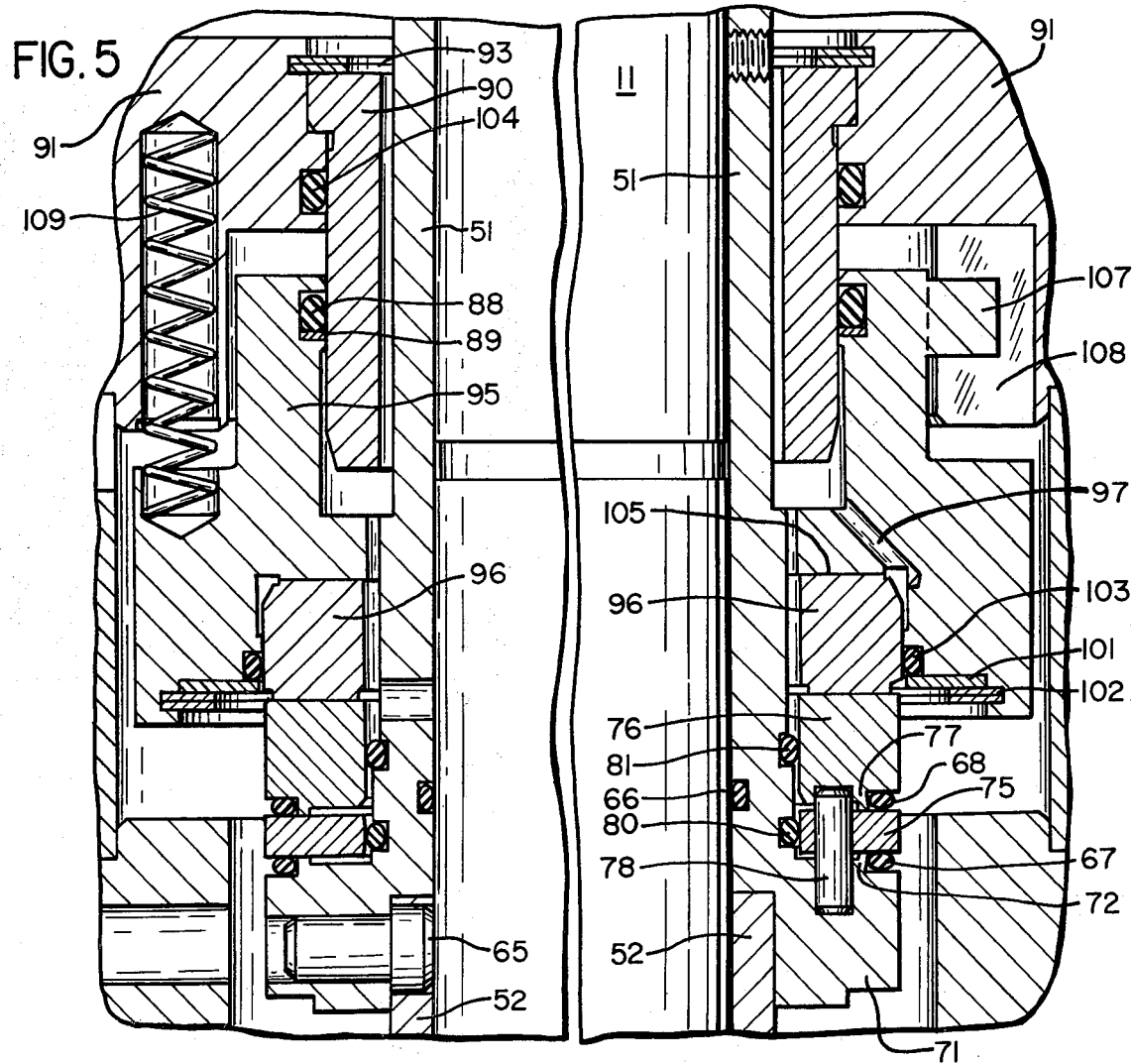
FIG. 5 is an enlarged view of one of the seal stages shown in FIG. 4 with the central portion of the shaft broken away.
FIG. 6 is a diagrammatic view showing the radial friction force at the support nose interface between the support ring and sleeve and the resulting twisting moment acting upon the support ring of the rotating seal assembly in FIG. 5.
FIG. 7 is an enlarged section view of the seal sleeve and rotating seal assembly in FIG. 5.

A description of the three stage seal assembly, as shown in FIGS. 4 and 5 follows. The rotating elements will be described first.

Mounted one below another on shaft 11 are a drive sleeve 50, an upper seal assembly sleeve 51, a middle seal assembly sleeve 52, and a lower seal assembly sleeve 53. The three seal stages are essentially identical to each other.

The upper end of drive sleeve 50 is connected to the shaft by means of a nut 54 on the sleeve and a nut 55 on the shaft, these two nuts being secured together by screws 56. Relative rotation of sleeve 50 and shaft 11 is prevented by a key 57 in the shaft and sleeve.

The upper end of upper seal sleeve 51 is secured to the lower end of drive sleeve 50 by a coupling ring 60, retaining ring 61 and a plurality of screws 62. The upper end of middle seal sleeve 52 is secured to the overlapping lower end of sleeve 51 by a pair of radial drive pins 65 inserted from the inside of the sleeves thru holes in both sleeves 51 and 52. The upper end of lower seal assembly sleeve 53 is secured in the same manner to the lower end of sleeve 52. Thus the four sleeves 50, 51, 52 and 53 are caused by key 57 and pins 65 to rotate with the shaft 11. Sealing the pressure at the inside diameter of the seal assembly is static O-ring 66 which is disposed between shaft 11 and seal sleeves 51, 52, and 53.

The lower end of each seal assembly sleeve 51, 52 and 53 has a radial flange 71 providing an annular support with a raised annular nose projection 72 supporting a rotating support ring 75. A rotating seal ring 76 is seated on support ring 75 thru a raised annular nose 77. Axial pins 78 loosely engage the three parts 51 (also 52 and 53), 75 and 76 to prevent relative rotation between these parts. O-rings 67 and 68 located between the rotating seal ring 76, support ring 75 and the sleeve flange 71 on the outer diameters of raised annular noses 72 and 77 are sealing O-rings while O-rings 80 and 81 are used to center the rotating seal ring 76 and support ring 75 on the sleeves 51, 52 and 53. Thus each sleeve 51, 52 53 serves as a seal ring carrier.

A description of the non-rotating elements of the three stage seal assembly follows: Again refer to FIGS. 4 and 5, noting that all of the non-rotating elements are contained in seal holder 82 which is retained in the stuffing box 22 by the stuffing box extension 83 and split thrust ring 84. Thrust ring 84 is held in place by clamping ring 85 and screws 86 as shown. The stuffing box extension 83 is necessary to modify the stuffing box 22 of pumps already in field service for the new three stage balanced stator seal assembly. The stuffing box extension 83 is retained by a plurality of studs 87 and nuts.

In the upper end of seal holder 82 a secondary seal sleeve 90 is retained in an upper seal gland 91 by a retaining ring 93. A stationary seal ring carrier 95, as shown in FIG. 5, is mounted and centered on the secondary seal sleeve 90 with a secondary seal O-ring 88 and backup ring 89.

The carrier 95 provides the necessary support for the low modules (carbon) stationary seal ring 96, and serves to isolate it from any deflections or distortion that occur in adjacent stationary parts. The configuration of the carrier is influenced by the design requirement to move axially ¾ inch and to tilt to a limited degree on the secondary seal sleeve 90.

The secondary seal referred to comprises O-ring 88 and anti-extrusion backup ring 89. Although backup ring 89 is not required during normal operation it is required to prevent extrusion of the O-ring 88 in the event that one seal in this pressure staged three seal assembly is subjected to full system pressure. The secondary seal 88 and 89 is affixed to the "floating" carrier 95 rather than sleeve 90 to assure that the pressure induced load distribution around the carrier does not change (no change in exposed area) as the carrier follows axial shaft displacement. Changes in the load distribution around carrier 95 would affect the deflection of carrier 95 and ultimately the sealing gap between the stationary and rotating seal rings 96 and 76.

Also, to avoid any changes in the load distribution on the carrier 95 and stationary seal ring 96 in the area (cavity) behind O-ring 103 due to the possibility of increased pressure in this area from leakage past O-ring 103 or porosity in the stationary seal ring 96, a vent hole 97 to the low pressure side of the seal has been provided.

Retainer rings 101 and 102 hold the O-ring 103 and stationary seal ring 96 in the stationary seal ring carrier 95. O-ring 103 is disposed between stationary seal ring 96 and its carrier 95. An O-ring 104 is disposed between the stationary seal gland 91 and the secondary seal sleeve 90. These O-rings 103, 88 and 104, and backup ring 89, provide static sealing between high and low pressure sides of each seal stage.

The various O-rings referred to above are rings of compact section and resilient mechanical properties, being non-metallic, elastomeric in origin and having a crossection square, round, or X-shaped, three-eighths inch or smaller across the section.

During operation of the seal a circumferential friction force is generated at the sealing gap between the stationary and rotating seal rings 96 and 76. This force (torque) is transmitted to the carrier by friction between the carrier 95 and seal ring 96 at their interface 105 and thru O-ring 103. Therefore, anti-rotation devices such as those typically used in prior art seals are not used in this design to prevent rotation of the stationary seal ring. The magnitude of the circumferential friction load is based on the normal interface load and friction coefficients of the seal materials and the friction characteristics of the viscous film between the rotating and stationary seal faces. The advantage of preventing rotation with friction is that the seal ring is uninterrupted by the usual slots and holes required by drive keys or pins, thus assuring symmetrical load distribution on asymmetrical parts.

Carrier rotation is resisted by a single anti-rotation lug 107 on the carrier 95 which projects into an axial slot 108 in the adjacent seal gland 91. The anti-rotation lug 107 is positioned over the secondary seal 88 and 89 to eliminate the induced longitudinal twisting moment between the lug and secondary seal on the carrier that would otherwise be present if the lug were located elsewhere, and thereby eliminates any reaction forces at the seal faces.

Axial compression springs 109 urge the stationary seal ring carrier 95 and stationary seal ring 96 toward the rotating seal ring thus assuring mutual contact of the seal faces. Since the present seal assembly is designed to accommodate a total variation in axial shaft displacement of up to ¾ inch, the springs 109 are sized to provide adequate load over this entire range. To do this it is necessary to use as long (free length) a spring as possible with a very low spring rate.

The middle seal stage surrounding sleeve 52 and the lower seal stage surrounding sleeve 53 comprise the same parts just described in the upper seal stage.

The seal pressure staging system will now be described.

The inlet flow 122 in FIG. 1, also indicated at the bottom of FIG. 4, comes in contact with and cools the rotating and stationary seal rings 75, 76 and 96, respectively, in the three seal stages. After passing thru an internal filter 110, which is provided as an integral part of the seal assembly, the cooling or staging flow passes to the middle and upper seal stages through internal staging coils 112, 113, and to the return flow collection system through an external staging coil 111 which reduces the return flow to return system back pressure or atmospheric pressure.

Figure 8:
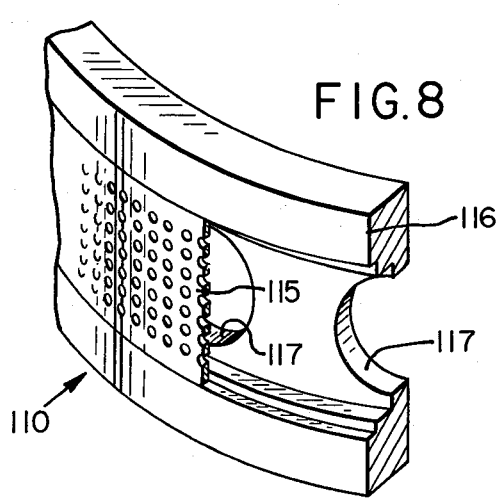
FIG. 8 is a fragmentary perspective view of a portion of the internal filter assembly shown in FIG. 4.

The internal filter 110 shown at the bottom of FIG. 4 and in detail in FIG. 8, is used to prevent debris, if present in the water, from plugging the staging coils 112, 113, and 111. In its present construction the filter assembly 110 consists of a perforated metal plate 115 formed into a ring and welded to a load bearing ring 116 designed to expose the entire surface of the perforated plate to the coolant flow. Ring 116 contains large openings 117. Various changes may be made in the details of construction of the filter assembly 110.

The staging coils 112, 113, and 111 provide the necessary resistance to limit the coolant flow to a desired rate at normal operating conditions and reduce the system pressure equally across each seal stage. The use of internal coils in the lower and middle seal stages, coils 112 and 113 respectively, minimizes stuffing box penetrations and provides a buffering effect on temperature transients. (Coils exposed to both external and internal flow function similar to heat exchangers)

Under normal operating conditions, each seal stage is maintained at substantially constant temperature to eliminate seal ring distortion from temperature change. However, in the event of a failure of the injection system and subsequent loss of injection flow 23 the seal assembly would be subject to higher temperatures due to the flow of high temperature water from the reactor coolant pump loop into the stuffing box thru the restriction bushing 18. The seal assembly is designed to function under such an abnormal condition as will be presently described.

One of the most important features of the seal assembly in regard to reducing the effects of temperature and pressure transients upon seal face deflection is the manner in which the rotating seal ring 76 is supported and isolated on each of the seal sleeves 51, 52 and 53. As shown in FIG. 5 and in greater detail in FIG. 7 the rotating seal ring 76 is isolated from seal sleeve radial flange 71 through an intermediate support ring 75 and is isolated and centered on the seal sleeve 51 by a non-sealing O-ring 81. Similarly, non-sealing O-ring 80 centers and isolates the support ring 75 on the seal sleeve 51.

In principle, the support ring 75 functions as follows to reduce the effects of temperature and pressure transients: during an increasing temperature transient, the sleeve 51 and radial flange 71 expand at a greater rate than carbide support ring 75. This relative displacement along the radial interface friction force (Ff) between radial flange 71 and support ring 75 develops an unbalanced moment (Mf) in the support ring in FIG. 6 which causes it to deflect slightly as illustrated in FIG. 7. The magnitude of this deflection, indicated by angle 125, is a function of the square of the ring thickness. The ring thickness, therefore, can be optimized to control this deflection. A decreasing temperature transient has the opposite effect causing the support ring to be twisted in the opposite direction from that shown in FIG. 7.

However, since the support ring 75 and rotating seal ring 76 have the same coefficient of expansion (in this case the materials are the same) and both rings 75 and 76 are exposed to the same seal coolant or staging flow temperature, they expand, essentially, at the same rate. This essentially eliminates the radial friction from their interface. Also, since the elastic modulus and radial dimensions are the same for each ring, (75 and 76) any hoop deflection due to pressure is the same.

If support ring 75 were not used, then the rotating seal ring 76 would be twisted in the same manner as support ring 75 shown in FIG. 7 and unacceptable face deflections would occur. However in the present arrangement the rotating seal ring 76 is only subjected to a slight shift in the location of the reaction load (Fn) from its nominal center of pressure (diameter DRMS) on the annular projection or support nose 77 and the resulting change in deflection is therefore insignificant. This would also be true for the unlikely case, shown in FIG. 7, where the entire reaction load (Fn) is shifted to the edge (line contact on outer diameter) of the annular projection 77 due to the narrow width of annular projection 77.

The width and location of the support nose 77 on the rotating ring 76 are designed for optimum support and minimum deflection of the rotating ring 76. The cross section (shape) of the rotating ring 76 is load "balanced" as a free body and is designed for zero twisting moment.

Support ring 75 is designed to be as thin as possible without allowing excessive deflection during transients. (The overall axial length of the seal in this application must fit as a cartridge unit thru the space between the pump and motor shafts, 11 and 12 respectively, when the coupling 13 is removed. Therefore the length of the seal must be minimized and all seal parts must be as thin as possible.

Support ring 75 is similarly supported on narrow nose or annular projection 72 on radial flange 71. Flange 71 provides an annular supporting surface for support ring 75.

These annular projections 72 and 77 are concentric with the sleeve (51, 52 and 53) centerline and have equal inner and outer diameters. These diameters are equal in order to co-axially load the support ring 75 with no induced twisting moments during steady state operation. The width of these annular projections 72 and 77 is made as narrow as possible to carry the axial reaction load without overstressing the material in compression. In the present preferred embodiment the width of projections 72 and 77 does not exceed one-fifth the radial width of seal ring 76.

As previously mentioned, four O-rings, 80, 81, 67 and 68, are used in mounting the rotating seal ring 76. Two of these O-rings, 67 and 68, are disposed on opposite faces of rotating support ring 75; these O-rings provide static sealing between the high pressure to low pressure side of the seal. The remaining O-rings, 80 and 81, which are non-sealing (vented) are disposed between seal sleeve 51 (52 and 53) and rotating support ring 75 and rotating seal ring 76 respectively to position these rings concentrically about the sleeve. These centering O-rings are necessary because of clearance provided between the rotating rings, 75 and 76, and the sleeve 51. This clearance was provided to prevent fracturing of the rotating rings 75 and 76 due to possible interferences at their bores during extreme temperature transients. (Sleeves and rotating rings have different coefficient of expansion).

Various changes may be made in the details of construction and arrangement of parts, such as positioning a support ring 75 on an annular projection (similar to 72) to support the stationary seal ring 96, or centering any of the seal rings (stationary seal ring 96, rotating seal ring 76 and support ring 75) by positioning nonsealing O-rings or similar devices between the outer diameter of any or all of these rings (96, 76, 75) and a surrounding carrier. All such modifications within the scope of the appended claims are included in the invention.

What is claimed is:

1. A shaft seal comprising a non-rotating seal ring and a rotating seal ring in end face mutual contact in which a support ring is located behind one of said seal rings, face surfaces on said one seal ring and support ring confronting each other, an annular projection on one of said confronting surfaces engaging the opposite confronting surface to support said one seal ring on said support ring, an annular support behind said support ring, face surfaces on said annular support and said support ring confronting each other, and an annular projection on one of said last confronting surfaces engaging the opposite confronting surface to support said support ring on said annular support, said annular projections having diameters causing said support ring to be normally free of any unbalanced forces, said first annular projection being on said one seal ring and said second annular projection being on said annular support.

2. A seal as defined in claim 1, each of said annular projections being narrow in relation to the radial width of said one seal ring.

3. A seal as defined in claim 2, said two annular projections being of substantially equal outside diameters and substantially equal inside diameters and of a width not exceeding one-fifth said radial width of said one seal ring.

4. A seal as defined in claim 1, each of said annular projections being spaced away from the inside and outside diameters of said one seal ring.

5. A shaft seal comprising a non-rotating seal ring and a rotating seal ring in end face mutual contact in which a support ring is located behind one of said seal rings, face surfaces on said one seal ring and support ring confronting each other, a single nonresilient annular projection on one of said confronting surfaces engaging the opposite confronting surface to support said one seal ring on said support ring, an annular support behind said support ring, face surfaces on said annular support and said support ring confronting each other, and a single nonresilient annular projection on one of said last confronting surfaces engaging the opposite confronting surface to support said support ring on said annular support, said annular projections having diameters causing said support ring to be normally free of any unbalanced forces and said annular projections being of narrow width in relation to the radial width of said support ring.

6. A seal as defined in claim 1, said one seal ring being the said rotating seal ring.

7. A shaft seal comprising a non-rotating seal ring and a rotating seal ring in end face mutual contact in which a support ring is located behind one of said seal rings, face surfaces on said one seal ring and support ring confronting each other, an annular projection on one of said confronting surfaces engaging the opposite confronting surface to support said one seal ring on said support ring, an annular support behind said support ring, face surfaces on said annular support and said support ring confronting each other, and an annular projection on one of said last confronting surfaces engaging the opposite confronting surface to support said support ring on said annular support, said annular projections having diameters causing said support ring to be normally free of any unbalanced forces, said annular support comprising a radial surface on a seal ring carrier, resilient non-sealing centering and isolation rings interposed between said one seal ring and said carrier and between said support ring and said carrier, and resilient sealing O-rings interposed between said one seal ring and said support ring and between said support ring and said radial surface.

8. A seal as defined in claim 7, said centering and isolation non-sealing rings being O-rings.

9. A seal as defined in claim 7, said one seal ring being the said rotating seal ring.

10. A seal as defined in claim 9, said centering and isolation non-sealing rings being interposed between said one seal ring inner diameter and said carrier and between said support ring inner diameter and said carrier.

11. A seal as defined in claim 9 including a seal ring carrier for said non-rotating seal ring, a stationary seal gland, and a plurality of axial springs compressed between said carrier and gland to urge said non-rotating seal ring into mutual face contact with said rotating seal ring, said seal ring carrier being of sufficient length and configuration to allow said non-rotating seal ring to remain in contact with said rotating seal ring and follow axial displacements of said shaft.

12. A seal as defined in claim 11 including a stationary secondary seal sleeve mounted in said seal gland and extending along said carrier, a secondary seal ring interposed between said carrier and said secondary sleeve, a single anti-rotation lug projecting radially from said carrier and engaging an axial slot in said gland, said lug being positioned radially opposite said secondary seal ring, and said sleeve having sufficient length to maintain contact with said secondary seal ring as the carrier follows said axial displacements of said shaft.

13. In a shaft seal having a rotating seal ring and a non-rotating seal ring, a seal ring carrier for said non-rotating seal ring, a stationary seal gland, a plurality of axial springs compressed between said carrier and gland to urge said non-rotating seal ring into mutual face contact with said rotating seal ring, said seal ring carrier being of sufficient length and configuration to allow said non-rotating seal ring to remain in contact with said rotating seal ring and follow axial displacements of said shaft, a stationary secondary seal sleeve mounted in said seal gland and extending along said carrier, a secondary seal ring interposed between said carrier and said secondary sleeve, a single anti-rotation lug projecting radially from said carrier and engaging an axial slot in said gland, said lug being positioned radially opposite said secondary seal ring, and said sleeve having sufficient length to maintain contact with said secondary seal ring as the carrier follows said axial displacement of the shaft.

14. A multi-stage shaft seal assembly comprising a stationary cylindrical seal holder surrounding said shaft and supporting non-rotating seal rings at intervals along the shaft, a drive sleeve on said shaft having one end connected to said shaft, a first seal assembly sleeve on said shaft having one end connected to the opposite end of said drive sleeve, additional seal assembly sleeves on said shaft having adjacent end portions overlapping each other, radial pins installed from the bore of the sleeves through said overlapping end portions to connect said sleeves together and rotate the sleeves with the shaft, said pins being retained in said sleeves by said shaft, and a support ring on each of said seal assembly sleeves supporting a rotating seal ring in rotating face contact with one of said non-rotating seal rings.

15. A shaft seal assembly as defined in claim 14 including a cooling water pressure staging system for said seal rings arranged to inject a flow of cooling water through said seal stages in series, said pressure staging system comprising an inlet at one end of said cylindrical seal holder, an outlet at the opposite end, a filter between said inlet and the first seal stage in the path of said flow, and pressure staging passageways on said cylindrical seal holder conveying said flow from each seal stage to the next and restricting the flow of the cooling water between said stages.

16. The combination of claim 15 said filter comprising an outward facing channel shaped ring on said one end of said cylindrical seal holder having openings to receive said flow from said inlet, and a plate having perforations only slightly smaller than the bore of said pressure staging passageways covering the open side of said channel to discharge said flow into the first staging passageway in the path of the flow.

17. A shaft face seal comprising a support ring supporting a seal ring of substantially the same coefficient of thermal expansion on an annular support, in which said support ring isolates the seal ring from any contact with other supporting surfaces through a pair of single annular nonresilient projections, one on each side of said support ring, with substantially equal outside and substantially equal inside diameters to impart loading on both sides of said ring at substantially the same diameters; and the said annular projections being of narrow width in relation to the radial width of the support ring to avoid significant changes of the loading points from the mean diameters when the support ring is twisted due to radial frictional loading between the annular projections and their mating surfaces.

18. In a shaft seal having a multi-stage seal assembly containing rotating seal rings in mutual face contact with non-rotating seal rings, a stationary cylindrical seal holder surrounding said rotating seal rings and supporting said non-rotating seal rings in engagement with said rotating seal rings, a cooling water pressure staging system for said seal rings arranged to inject a flow of cooling water through said seal stages in series, said pressure staging system comprising an inlet at one end of said cylinderical seal holder and an outlet at the opposite end, a filter on said one end between said inlet and the first seal stage in the path of said flow to prevent debris which is only large enough to cause plugging of said pressure staging system from entering said pressure staging system, and pressure staging passageways on said cylindrical seal holder conveying said flow from each seal stage to the next and restricting the flow of the cooling water between said stages.

* * * * *